Figure 1:
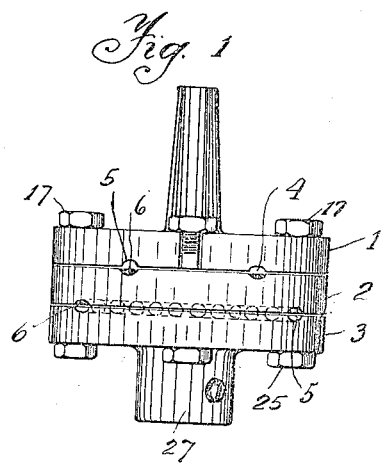

H. J. WATTS.
FLOATING TOOL CHUCK.
APPLICATION FILED NOV. 30, 1915.

1,241,175.

Patented Sept. 25, 1917.

WITNESSES:

INVENTOR.
H. J. Watts
BY
ATTORNEYS.

UNITED STATES PATENT OFFICE.

HARRY J. WATTS, OF TURTLE CREEK, PENNSYLVANIA.

FLOATING TOOL-CHUCK.

1,241,175. Specification of Letters Patent. Patented Sept. 25, 1917.

Application filed November 30, 1915. Serial No. 64,211.

*To all whom it may concern:*

Be it known that I, HARRY J. WATTS, a subject of the King of England, residing at Turtle Creek, in the county of Allegheny and State of Pennsylvania, have invented certain new and useful Improvements in Floating Tool-Chucks, of which the following is a specification.

This invention relates to a floating tool chuck and has for its object to provide a chuck of such type, in a manner as hereinafter set forth, with means to permit of the tool traveling in the path corresponding to the lines and angles of a polygonal figure, having any desired number of lines and angles, when boring or drilling a polygonal-shaped opening whereby the opening drilled or bored will correspond to the figure.

A further object of the invention is to provide a tool chuck in a manner as hereinafter set forth, with means to permit of the tool traveling eccentrically with respect to the work operated upon.

Further objects of the invention are to provide a floating tool chuck which is simple in its construction and arrangement, strong, durable, efficient and convenient in its use, readily set up, and comparatively inexpensive.

With the foregoing and other objects in view the invention consists of the novel construction, combination and arrangement of parts as hereinafter more specifically described and illustrated in the accompanying drawing, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is an elevation of a floating tool chuck in accordance with this invention.

Figure 2:
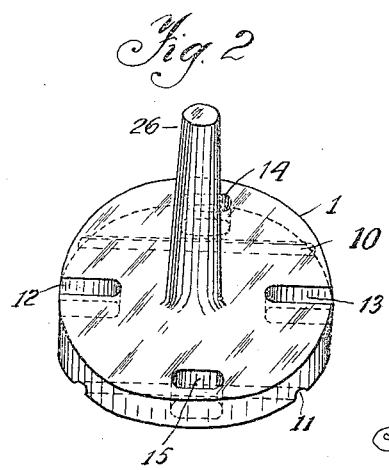
Figure 3:
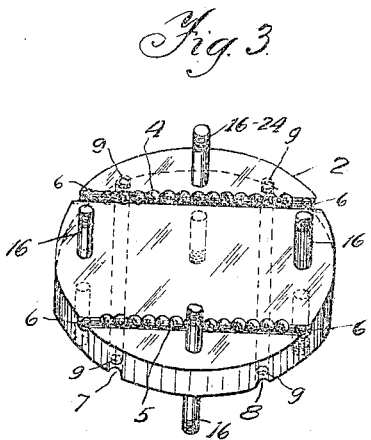
Figure 4:
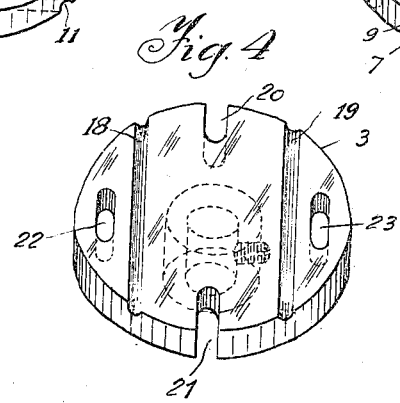

Figs. 2, 3, and 4 are perspective views of the elements of the chuck.

A floating tool chuck in accordance with this invention includes a plurality of opposed elements, as illustrated circular disks, and these latter are indicated at 1, 2, and 3. The upper face of the disk 2 is formed with a pair of transverse grooves 4, 5, providing ball races and in which bearing balls are arranged. Each end of a groove has a stud 6 for the purpose of maintaining the balls within the race. The lower face of the disk 2 has a pair of transverse grooves 7, 8, which provide ball races and in which are adapted to be mounted bearing balls. Each end of a groove 7, 8, has a stud 9 for the purpose of maintaining the balls within the race.

The grooves 4, 5, extend at right angles with respect to the grooves 7, 8, and the grooves 4, 5, are spaced from each other and the grooves 7, 8, are spaced from each other.

The disk 1 is mounted upon the disk 2 and has its lower face provided with a pair of grooves 10, 11, which aline with the grooves 4, 5, and in the grooves 10, 11 extend the balls mounted in the grooves 4, 5. The disk 1 is furthermore provided with a pair of radially disposed slots 12, 13 which extend in the same plane and are arranged diametrically opposite and said disk 1 furthermore has a pair of slots 14, 15 which are arranged in parallelism and are diametrically opposed.

Carried by the disk 2 are studs 16 which extend up through the slots 12, 13, 14 and 15 and are provided with heads 17 and the studs 16 in connection with the said slots permit of the disk shifting upon the disk 2. The studs limit the shifting movement of said disk 1 with respect to said disk 2.

The disk 3 has its upper face provided with a pair of transverse grooves 18, 19, which aline with the grooves 7, 8, and in which extend ball bearings which are mounted in said grooves 7, 8, and said disk 3 is furthermore provided with a pair of radially disposed slots 20, 21, and a pair of slots 22, and 23. The slots 20, 21 extend in the same plane and are arranged diametrically opposite, the slots 22, 23, are arranged in parallelism and are arranged diametrically opposite. Depending from the disk 2 is a series of studs 24 which extend through the slots 20, 21, 22 and 23 and provided with heads 25 and the said slots and studs permit of the shifting of the disk 3 against the disk 2.

The slots 20, 21 are arranged below the slots 14, 15 but in alinement therewith and the slots 22, 23 are arranged below but in alinement with the slots 12, 13. The slots 20, 21, 22, and 23 are oppositely disposed with respect to the slots 12, 13, 14, 15 and by such an arrangement the disk 3 shifts with respect to the disk 1 in a plane parallel thereto.

The disk 1 is provided with a shank 26 for the purpose of connecting the chuck to a means for rotating it when using a drill press or to a means for anchoring it when used in a lathe.

The disk 3 is provided with means as at 27 for connecting a tool therewith.

The disks 2, 3, can shift in parallel planes with respect to each other and with respect to the disk 1, and owing to the manner in which the disks 1, 2, and 3 are set up a means is provided for holding and supporting a tool so that the latter may be controlled by additional means, not shown, to follow the outlines of any desired figure.

A suitable inclosing casing can be provided for the disks but such casing may be of a size as not to interfere with the shifting of the disk.

What I claim is:—

1. A floating tool chuck comprising a slotted disk having a rearwardly extending shank, a shiftable slotted disk having a forwardly extending socket for connecting a tool therewith, a shiftable element interposed between and carrying means extending through the slots of said disks for limiting the shifting movement of said element relatively to the disk having the shank and the shifting movement of the disk having the socket relatively to said element, said means connecting the disks and element together and further providing for the bodily rotating of said disk and element.

2. A floating tool chuck comprising a disk having its rear face provided with means for connection with a prime mover, a plurality of opposed members capable of shifting parallel with each other and with the inner of said opposed members shiftable across the forward face of said disk, means carried by said inner member for permanently connecting said members and disks together whereby said members and disks will bodily rotate when said disk is rotated, said means limiting the shifting of said members parallel to each other and to said disk, and the outer of said members having its forward face provided with means for connecting a tool therewith.

3. A floating tool chuck comprising a disk, a plurality of opposed members capable of shifting parallel with respect to each other and each capable of shifting beyond the edge of the other and one capable of shifting across the forward face of and beyond the edge of said disk, means carried by the inner one of said opposed members for connecting said members and disk together, said means limiting the shifting of said members with respect to each other and with respect to said disk, and the outer of said members having its forward face provided with means for connecting a tool therewith.

4. A floating tool chuck comprising a flat disk, a plurality of opposed flat members capable of shifting parallel to each other and to said disk, means carried by the inner one of said opposed members and extending through the outer member and disk for connecting said members and disk together for bodily rotation and to limit the shifting movement of said members relatively to each other and to the disk.

5. A floating tool chuck comprising a flat disk, a plurality of opposed flat members capable of shifting parallel to each other and to said disk, means carried by the inner one of said opposed members and extending through the outer member and disk for connecting said members and disk together for bodily rotation and to limit the shifting movement of said members relatively to each other and to the disk, said disk having its forward face and said outer member having its rear face transversely grooved and said inner member having both of its faces provided with transverse grooves opposing the grooves of the disk and outer member, and bearing balls mounted in said opposing grooves.

In testimony whereof I affix my signature in the presence of two witnesses.

HARRY J. WATTS.

Witnesses:
 JAMES J. SNIGO,
 CHARLES J. WATTS.